United States Patent
Wenstrup

(10) Patent No.: US 6,875,713 B1
(45) Date of Patent: Apr. 5, 2005

(54) MOLDABLE COMPOSITE MATERIAL AND METHOD OF PRODUCING SAME

(75) Inventor: David E. Wenstrup, Easley, SC (US)

(73) Assignee: Milliken & Company, Spartanburg, SC (US)

(*) Notice: Subject to any disclaimer, the term of this patent is extended or adjusted under 35 U.S.C. 154(b) by 350 days.

(21) Appl. No.: 09/712,075

(22) Filed: Nov. 14, 2000

(51) Int. Cl.$^7$ ............................ D04H 5/00; A47C 23/00
(52) U.S. Cl. ................... 442/327; 5/401; 5/652; 297/452.16; 428/376; 428/398
(58) Field of Search ............... 5/401, 652; 297/452.16; 428/376, 398

(56) References Cited

U.S. PATENT DOCUMENTS

| | | | |
|---|---|---|---|
| 3,870,590 A | * 3/1975 | Hurwitz | 161/92 |
| 4,002,367 A | * 1/1977 | Thomas | 296/137 A |
| 5,591,289 A | * 1/1997 | Souders et al. | 156/148 |
| 5,770,309 A | * 6/1998 | Houpt et al. | 428/398 |
| 6,008,149 A | * 12/1999 | Copperwheat | 442/381 |
| 2001/0006165 A1 | * 7/2001 | Rashid | 215/383 |

OTHER PUBLICATIONS

U.S. Appl. 08/83016 to Copperwheat.*

* cited by examiner

Primary Examiner—Glenn Caldarola
Assistant Examiner—Alexis Wachtel
(74) Attorney, Agent, or Firm—Terry T. Moyer; Jeffrey E. Bacon

(57) ABSTRACT

A composite textile includes a batting layer, a cushion layer, and a face fabric. The batting layer has high melt temperature and low melt temperature fibers. The cushion layer is needled to the batting layer. The face fabric is bonded to the cushion layer by an adhesive. The face material/cushion layer/batting layer is heat set and rolled onto a roll for use in forming composite parts. The composite textile is more readily recyclable when the batting layer, the cushion layer, the adhesive, and the face material are all formed completely from material of the same chemical nature, such as polyolefin, polyester, or the like.

25 Claims, 2 Drawing Sheets

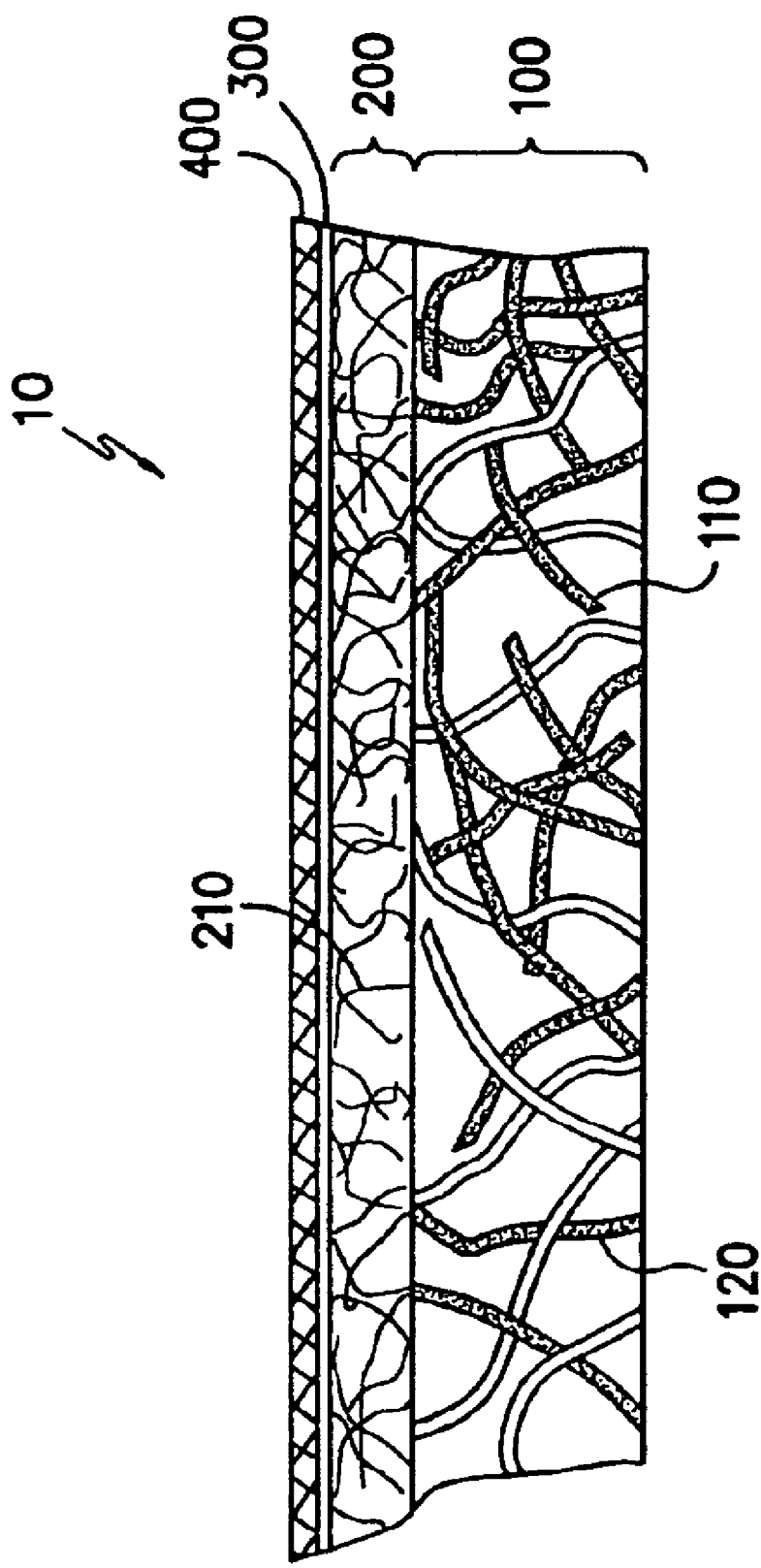
FIG. -1-

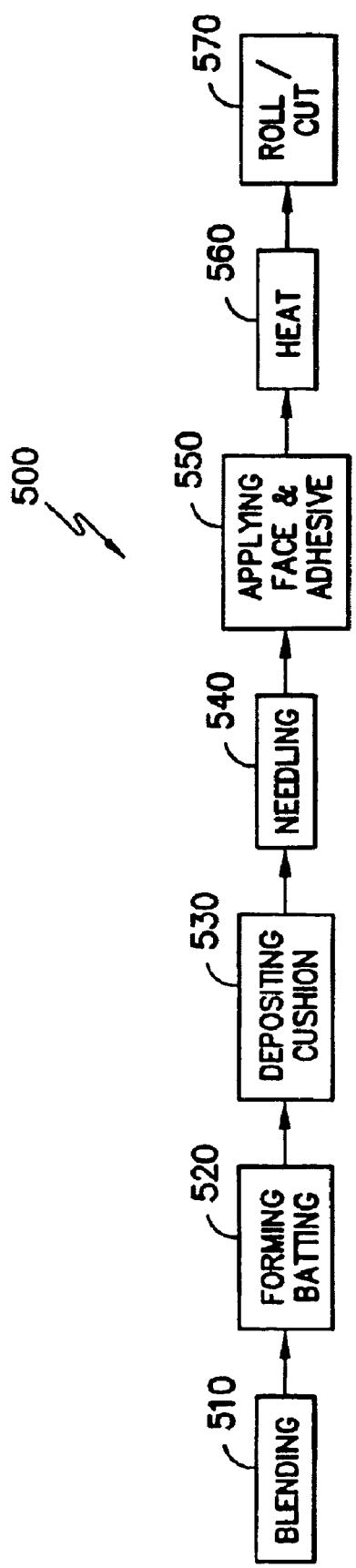
FIG. -2-
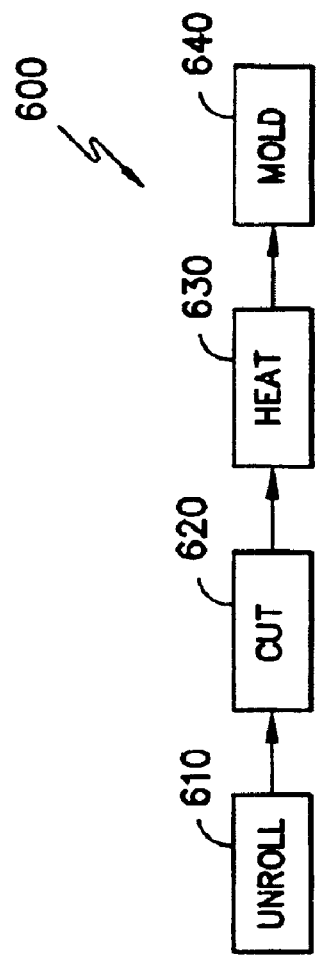
FIG. -3-

US 6,875,713 B1

MOLDABLE COMPOSITE MATERIAL AND METHOD OF PRODUCING SAME

BACKGROUND

The present invention generally relates to a moldable composite material having three layers: a surface layer to provide aesthetics and physical properties, a cushion layer, and a moldable layer.

Composite materials have been used in automobiles for components such as head liners, door panels, or the like. The composite materials typically used to form the molded parts are a face material bonded to various backing materials and a rigid molded material. The process of forming the completed molded part requires several steps, including the joining of these materials. Additionally, many combinations of materials used in forming these component parts are disimilar and are not readily recyclable.

Therefore, there exists a need for composite materials that can reduce the number of individual components and required steps in forming these molded parts. Additionally, there exists a need to standardize components of the final pare, allowing ease of recyclability.

BRIEF DESCRIPTION OF THE DRAWINGS

FIG. 1 is a cross sectional view of a composite nonwoven material illustrating one embodiment of the present invention.

FIG. 2 is a block diagram, illustrating one method of forming the composite nonwoven material in FIG. 1.

FIG. 3 is a block diagram, illustrating one method of forming component parts from the composite nonwoven material of the present invention.

DETAILED DESCRIPTION

Referring now to FIG. 1, there is shown cross sectional view of an embodiment of the present invention, illustrated as the textile 10. The textile 10 includes a batting layer 100, a cushioning layer 200 disposed on the batting layer 100, and a face textile 400 adhered to the cushioning layer 200 by an adhesive 300. The textile 10 produces a molded textile part that gives rigidity and cushion for use in automotive parts.

In the embodiment illustrated in FIG. 1, the batting layer 100 is a nonwoven material comprising of low melt temperature fibers 110 and high melt temperature fibers 120. The low melt fibers 110 and the high melt fibers 120 can be cross laid, air laid, or the like, to produce the batting layer 100 at the appropriate thickness. In one preferred embodiment, the low melt fibers 110 and the high melt fibers 120 are of the same chemical nature, such as a polyolefin, polyester, or the like. The low melt temperature fibers 110 typically comprise from about 50% to about 85% of the total weight of the batting layer 100. The high melt temperature fibers 120 typically comprise from about 15% to about 50% of the total weight of the batting layer 100. In one embodiment, the low melt fibers 110 are about 70% of the total weight of the batting layer 100, and the high melt fibers 120 are about 30% of the total weight of the batting layer 100. A typical thickness for the batting layer 100 ranges from about 4 mm to about 30 mm.

In the embodiment illustrated in FIG. 1, the cushioning layer 200 is a nonwoven material formed from staple fibers with high loft characteristics. In one embodiment, the staple fibers forming the cushion layer 200 are holofil fibers, or a similar type cushioning fiber. The cushioning layer 200 can be laid in the machine direction onto the batting layer 100 by techniques such as direct or may be corss-laid onto the preformed batting layer 100. In one preferred embodiment, the material of the cushioning layer 200 are of the same chemical nature as the low melt fibers 110 and the high melt fibers 120 in the batting layer 100, such as polyolefin, polyester, or the like. A typical thickness for the cushioning layer 200 is from about 0.5 mm to about 3.0 mm.

The batting layer 100 with the cushioning layer 200 thereon is needled to cause at least a portion of the fibers forming the cushion layer 200 to interlace with the non-woven material of the batting layer 100. The interlacing of the batting layer 100 with the cushioning layer 200 can occur in the batting layer 100, the cushion layer 200, or both. The interlacing of the batting layer 100 and the cushion layer 200 gives the individual layers strength, as well as provide a mechanical bond between the two layers.

The face textile 400 is a material that has abrasion resistance, light fastness, color fastness, and other characteristics suitable for use as surfaces in automobiles. The face textile 400 can be woven, knitted, nonwoven, or any other construction suitable for the application. As illustrated in FIG. 1, the face material 400 is adhered to the cushioning layer 200 by the adhesive 300, and the combination of batting layer 100, cushion layer 200, adhesive 300, and face material 400 is laminated together via heat. In one preferred embodiment, the face textile 400 and the adhesive 300 are of the same chemical nature as the batting layer 100 and cushion layer 200, such as polyolefin, polyester, or the like. In one embodiment, the adhesive is a polyester adhesive of about 115° C. to about 125° C. and is used to allow the subsequent material to pass standard automotive environmental aging tests.

When the textile 10 is pre-formed as a single unit, subsequent processing the textile into particular component parts is facilitated by the preformed unit. In the present invention, it is believed that the number of required materials to make the subsequent component part is reduced by 50–95%. Additionally, the recycleablity of the textile 10 is facilitated when the materials of the batting layer 100, cushion layer 200, adhesive 300, and face material 400, are all of the same chemical nature, such as polyolefin, polyester, or the like.

Referring now to FIG. 2, there is shown block diagram of an embodiment of a method for forming the composite nonwoven textile 10 from FIG. 1, illustrated as the method 500. The method 500 generally includes the steps of blending the batting layer fibers (510), forming a batting layer web (520), depositing a cushioning layer (530), needling the combination of the batting layer web and the cushioning layer web (540), applying a face textile and adhesive (550), heating the combination of the batting layer web, the cushion layer web, the adhesive, and the face textile (560), and rolling the composite textile into a roll or stacking the composite textile in pre-cut forms (570).

In step 510, the low melt fibers 110 and the high melt fibers 120 are blended for forming the batting layer 100. The low melt fibers 110 comprise from about 50% to about 85% of the total weight of the combined fibers, and the high melt fibers 120 comprise from about 15% to about 30% of the total weight of the combined fibers. In one embodiment, the low melt fibers 110 and the high melt fibers 120 are blended to forming a blend comprising about 70% by weight of the total blend of the low melt fibers 110, and about 30% by weight of the total blend of the high melt fibers 120.

In step 520, the blended fibers for the batting layer 100 from step 510 are formed into the batting layer web. In one embodiment, the fibers are laid in the cross direction to form the batting layer web.

In step 530, the cushion layer 200 is laid as a web onto the nonwoven web formed for the batting layer 100. The cushion layer 200 can be directed laid onto the batting layer 100, or can be a pre-formed web that is laid onto the batting layer 100. In a preferred embodiment, the fibers for the cushion layer 200 are of the same chemical nature as the material for the batting layer 100. In one embodiment, the fibers of the cushion layer include holofil fibers.

In step 540, the stacked webs for the batting layer 100 and the cushion layer 200 are needled in order to stabilize the individual layers, and to create a connection between the two layers.

In step 550, the face textile is applied onto the cushion layer web with the adhesive there between. In one embodiment, the adhesive is place onto the cushion layer web, and then the face textile is placed onto the adhesive. In another embodiment, the adhesive is place onto the face textile, and then the face textile is place onto the cushion layer web with the adhesive contacting the cushion layer web. The adhesive can be applied at a rate of from about 15 g/ft$^2$ to about 50 g/ft$^2$, and more preferably from about 15 g/ft$^2$ to about 25 g/ft$^2$. The adhesive can be applied as a preformed adhesive, a powder, an extrusion coating, or the like. In a preferred embodiment, the adhesive and the face textile are of the same chemical nature as the material for the batting layer web and the material for the cushion layer web.

In step 560, the combination of the batting layer web, the cushion layer web, the adhesive, and the face textile, is heated to a temperature to accomplish thermal bonding and form the textile 100.

In step 570, the textile 10 is cooled and rolled into a roll for later use or plated as pre-formed sheets for later use.

Referring now to FIG. 3, there is shown a block diagram of a process 600 for making component parts from the textile 10 from FIG. 1 according to the method in FIG. 2. The process 600 generally comprises the steps of unrolling a length of the composite nonwoven textile (610), cutting the composite textile into segments (620), heating the segments of composite textile (630), and molding the heated segments of composite textile into a component part (640). Alternatively, when the composite textile is in the form of pre-formed sheets, the step of unrolling 610 and the step of cutting 620 can be skipped, and the pre-formed sheets can be processed starting with the heating step 630.

What is claimed is:

1. A moldable composite material, having at least two distinct layers of nonwoven material, comprising:
    (a) a batting layer of nonwoven batting material, said batting layer including low melt temperature fibers and high melt temperature fibers;
    (b) a high loft non-rigid cushion layer of nonwoven material, said cushion layer having a first side disposed adjacent to said batting layer and a second side disposed opposite to said batting layer, said cushion layer including fibers;
    (c) a face textile disposed adjacent to the said second side of said cushion layer;
    (d) an adhesive adhering said face textile to said cushion layer; wherein at least a portion of the cushion fibers in said cushion layer interlace with
    (e) wherein at least a portion of said fibers in said cushion layer interlace with fibers of said batting layer.

2. The moldable composite material according to claim 1, wherein the low melt temperature fibers and the high melt temperature fibers of the nonwoven batting layer, the fibers of the nonwoven high loft non-rigid cushion layer, the face textile, and the adhesive are all of the same chemical nature.

3. The moldable composite material according to claim 1, wherein the low melt temperature fibers and the high melt temperature fibers of the nonwoven batting layer, the cushion fibers of the high loft non-rigid nonwoven cushion layer, the face textile, and the adhesive are all formed of the same material, said material being selected from the group consisting of: polyolefin and polyester.

4. The moldable composite material according to claim 1, wherein the low melt temperature fibers comprise between about 50% to about 85% of the total weight of said batting layer.

5. The moldable composite material according to claim 1, wherein the low melt temperature fibers comprise about 70% of the total weight of said batting layer of nonwoven batting material.

6. The moldable composite material according to claim 1, wherein the heigh melt temperature fibers comprise between about 15% to about 50% of the total weight of said batting layer of nonwoven batting material.

7. The moldable composite material according to claim 1, wherein the high melt temperature fibers comprise about 30% of the total weight of said batting layer of nonwoven batting material.

8. The moldable composite material according to claim 1, wherein the batting layer is from about 4 mm thick to about 30 mm thick.

9. The moldable composite material according to claim 1, wherein the cushion layer is from about 0.5 mm thick to about 3 mm thick.

10. The moldable composite material according to claim 1, wherein said nonwoven batting material is cross direction laid and said nonwoven cushion material is machine direction laid.

11. A method of forming a composite material, comprising the steps of: blending low melt temperature fibers with high melt temperature fibers; forming a batting layer web from the combined low melt temperature fibers and high melt temperature fibers;
    depositing a cushion layer web of cushion fibers on the batting layer web;
    needling the combination of the batting layer web and the cushion layer web;
    applying a face textile on the cushion layer web with an adhesive therebetween;
    heating the combination of the batting layer web, the cushion layer web, the adhesive, and the face textile to a temperature to accomplish thermal bonding.

12. The method according to claim 11, further including the step of pre-selecting the high melt temperature fibers, the low melt temperature fibers, the cushion fibers, the adhesive, and the face textile such that all are formed of material from the same chemical nature.

13. The method according to claim 11, wherein the step of blending includes proportioning the blend to have between about 50% and about 85% of the low melt temperature fibers per total weight of the combined blend of the low melt temperature fibers and the high melt temperature fibers.

14. The method according to claim 11, wherein the step of blending includes proportioning the combined blend to have about 70% of the low melt temperature fibers per total weight of the combined blend of the low melt temperature fibers and the high melt temperature fibers.

15. The method according to claim 11, wherein the step of blending includes proportioning the blend to have between about 15% and about 50% of the high melt temperature fibers per total weight of the combined blend of low melt temperature fibers and high melt temperature fibers.

16. The method according to claim 11, wherein the step of blending includes proportioning the combined blend to have about 30% of the high melt temperature fibers per total weight of the combined blend of the low melt temperature fibers and the high melt temperature fibers.

17. The method according to claim 11, wherein the step of forming the batting layer web includes forming batting layer web with the low melt temperature fibers, and the high melt temperature fibers laid in the cross direction.

18. The method according to claim 17, wherein the step of forming the cushion layer web includes forming cushion layer web with the cushion fibers laid in the machine direction.

19. The method according to claim 11, wherein the step of forming the cushion layer web includes forming cushion layer web with the cushion fibers laid in the machine direction.

20. The method according to claim 11, wherein the step of depositing the cushion layer web includes laying the cushion fibers directly on the batting layer web.

21. The method according to claim 11, wherein the step of depositing the cushion layer web includes preforming the cushion layer web and applying the preformed cushion layer web onto the batting layer web.

22. The method according to claim 11, further including the step of rolling the thermally bonded combination of the batting layer web, the cushion layer web, the adhesive, and the face textile into a roll.

23. A method according to claim 22, further comprising the steps of cutting a segment of the composite material from the roll, heating the segment of composite material to a molding temperature, and molding the sheet of composite material into a component.

24. The method according to claim 11, further including the step of cutting the thermally bonded combination of the batting layer web, the cushion layer web, the adhesive, and the face textile into at least one sheet.

25. A method according to claim 24, further comprising the steps of heating the sheet of composite material to a molding temperature, and molding the sheet of composite material into a component part.

* * * * *

UNITED STATES PATENT AND TRADEMARK OFFICE
CERTIFICATE OF CORRECTION

PATENT NO. : 6,875,713 B1
DATED : April 5, 2005
INVENTOR(S) : Wenstrup

It is certified that error appears in the above-identified patent and that said Letters Patent is hereby corrected as shown below:

Column 6,
Line 14, after the word "component", insert the word -- part -- .

Signed and Sealed this

Twenty-eighth Day of June, 2005

JON W. DUDAS
*Director of the United States Patent and Trademark Office*